July 18, 1933.  W. W. NUGENT  1,918,980
PRESSURE FILTER
Filed April 3, 1930    2 Sheets-Sheet 2
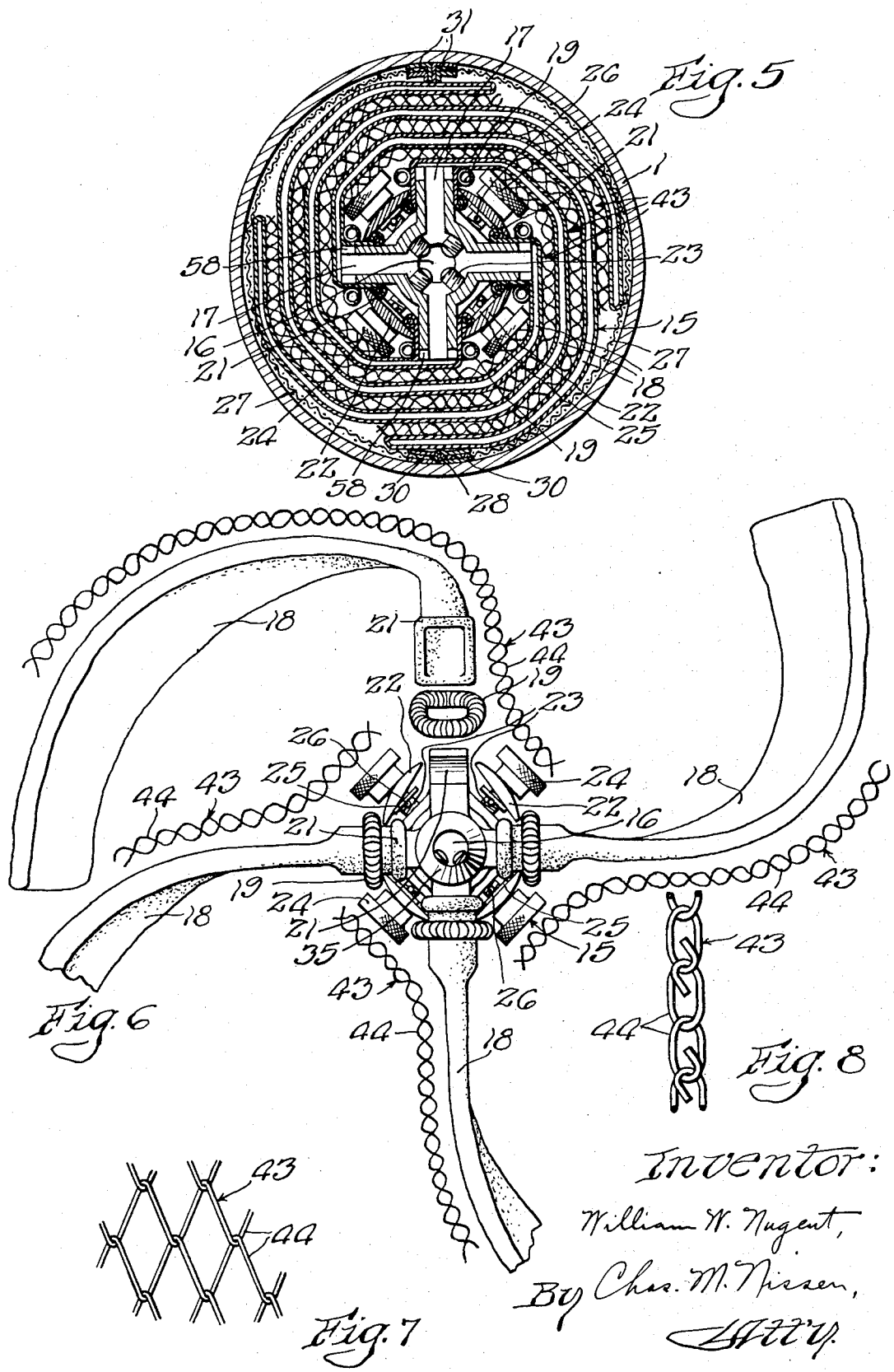
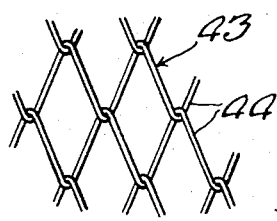

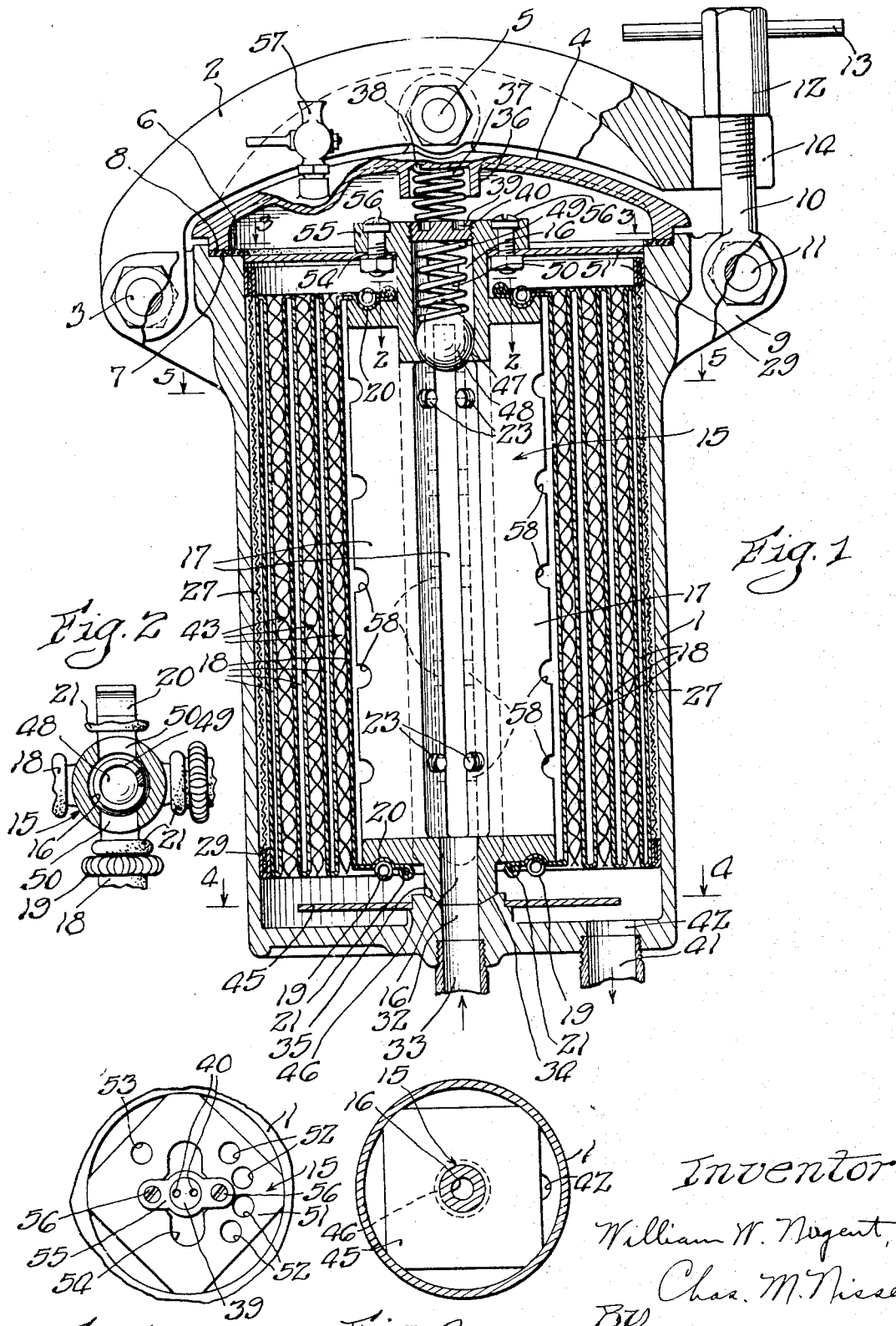

Patented July 18, 1933

1,918,980

UNITED STATES PATENT OFFICE

WILLIAM W. NUGENT, OF CHICAGO, ILLINOIS

PRESSURE FILTER

Application filed April 3, 1930. Serial No. 441,220.

The present invention relates to a filtering device and more particularly to that class of filtering devices which are adapted to operate under pressure so as to increase the capacity thereof. In this type of filter it is desired to provide a filtering unit which is readily removable to permit cleaning of the filtering elements and to enable one to readily assemble or disassemble or replace worn out parts of the filtering unit.

One object of this invention is to provide a compact structure which can be readily installed, and which permits the greatest amount of accessibility to the various parts.

Another object of this invention is to provide a filter which may be readily cleaned or in which the parts may be readily replaced.

Another object of this invention is the provision of readily releasable means for securing the filter bags in position in the filter so as to permit the ready removal thereof and yet insure that the same are held firmly in their desired positions within the filter while the same is in operation.

Another object of this invention is to use a plurality of filter bags with suitable spaced elements therebetween to permit the utilization of the maximum filtering surface of the filter bags.

Another object of this invention is to provide a split frame or cage for enclosing the filter bags within a predetermined space which is less than the space of the casing into which the filter bags are inserted and of a shape substantially conforming with the shape of the casing. By this means I am enabled to assemble the filter bags within the cage and then insert the same quickly within the casing without disturbing the relative positions of the filter bags and without making it necessary to manually adjust the edges of the filter bags as the same are being placed in the casing as it often happens with devices of this nature that one is not able to insert the filter bags within the casing because the same come into contact with the edges of the casing and retard, if not absolutely prevent the entrance of the filter bags or the filtering unit into the casing.

Another object of this invention is the provision of means for spacing the filter bags from the bottom of the casing for a purpose hereinafter to be described.

Another object of this invention is the provision of openings in the top part of the frame for the filtering unit for the purpose of readily grasping the filtering unit and removing the same from its casing.

Another object of this invention is to provide means which will permit the oil to be by-passed through the filter in the event that the filter bags become clogged to such an extent that the liquid being filtered will no longer pass therethrough.

Another object of this invention is the provision of inlet and outlet openings in the casing proper and the provision of novel means for connecting the inlet opening to the filtering unit. As part of the means for connecting the inlet with the filtering unit, I provide a spring on the cover of the casing for holding a conduit in the filtering unit against a suitably constructed seat surrounding the inlet opening.

By this construction as soon as the cover of the casing is thrown open, the filtering unit may be immediately removed. Other objects of this invention will appear hereinafter as the description of the invention proceeds.

In the drawings—

Fig. 1 is a vertical cross-sectional view taken through an apparatus embodying my invention;

Fig. 2 is a section taken on the line 2—2 of Fig. 1;

Fig. 3 is a section taken along the line 3—3 of Fig. 1;

Fig. 4 is a section taken along the line 4—4 of Fig. 1;

Fig. 5 is a section taken along the line 5—5 of Fig. 1;

Fig. 6 is a bottom plan view of the filtering unit with the filter bags shown in extended position and with one of the filter bags removed from the central spool shaped member which will later be described; and Figs. 7 and 8 are views showing the construction of the spacing members which are interposed between the filter bags.

The filtering unit comprises a cylindrical casing 1, having an arm 2 pivoted thereto at 3. The arm 2 has a suitable circular cover 4 pivoted thereto at 5 and this cover is adapted to close the upper open end of the casing 1. In order to provide a suitable liquid tight connection between the cover and casing, I provide the gasket 6 which rests upon the seat 7 of the cylindrical casing 1 and the bearing surface 8 on the cover is adapted to rest on the upper side of the gasket. In order to hold the cover firmly against the gasket, I provide a lug 9 on the side of the casing opposite to the pivot 3 and pivotally support the bolt 10 thereto at 11. This bolt carries a nut 12 having an operating handle 13. The arm 2 is provided with a slot 14 for the reception of the bolt 10 and the nut 12 is adapted to engage the upper surface of the arm adjacent the edges of the slot so that when the nut is rotated in the proper direction the same will draw the arm 2 downwardly, and as a result press the cover 4 firmly against the gasket which is compressed between the bearing surface 8 and the seat 7 to form a liquid tight connection.

The filtering unit which I place within the casing comprises a central spool shaped member designated generally as 15, and this spool shaped member has a longitudinal opening 16 extending therethrough.

Radially extending openings 17 communicate with the openings 16 and as best illustrated in Figs. 2, 5, and 6, the spool shaped member has a cross-section substantially in the form of a cross with the edges of the extreme end portions of the radially extending parts of the cross forming lip portions surrounding the openings 17.

The filter bags 18 are open at one end and these open ends are placed over the lips on the spool shaped member so that the openings in the filter bags communicate with the radially extending openings 17 in the spool shaped member. In order to secure the filter bags in place, I provide endless coiled springs 19 which are placed over the outer surfaces of the filter bags adjacent their mouths to hold the same in firm engagement with the lip portions of the spool. Notches 20 are provided at the opposite ends of the spool shaped member for the purpose of preventing accidental movement of the springs out of their operative position and for the purpose of more securely holding the filter bags against the lips on the spool shaped members adjacent the ends thereof. Preferably I provide each of the filter bags with a beaded portion 21 around the edge thereof, which beaded portion cooperates with the spring and with the clamping means hereinafter to be described to more securely hold the filter bag in proper position.

On the outside of the spool and between adjacent openings 17, I provide suitable clamping plates 22, the opposite edges of which are adapted to engage adjacent edges of the adjacent filter bags and hold the same against the spool shaped member when the clamping plates are drawn towards the spool shaped member. In order to draw the plates towards the spool shaped member, I provide clamping screws 23 which extend freely through suitable openings in the clamping plate 22 and which are non-removably held in said openings by means of the operating heads 24 on the screws and the collars 25 surrounding the screws and held thereon by means of the pins 26. In this manner, although the screws 23 are free to rotate in the plates 22, the same are constrained to move with the plates 22 and cannot be removed from the openings in said plates. The threaded parts of the screws 23 are received within the hub of the spool shaped member and rotation of the screws in the proper direction draws the edges of the clamping plates into engagement with the filter bags to clamp the edges of the filter bags against the lip portions of the spool shaped member.

By the arrangement just described, it will be noted that the filter bags are held in place over the openings 17 by means of the springs which securely hold the opposite ends firmly in engagement with the lip portions and the clamping plates which hold the sides of the filter bag in engagement with the sides of the lip portions. The springs hold the edges of the filter bag in the notches 20 at the opposite ends of the spool shaped member at the places where the clamping plates 22 are inoperative. Of course, I may desire to hold the filter bags on the spool shaped member solely by means of clamping plates but I prefer to use a combination of the two clamping means such as I have illustrated. It will be noted in connection with the collars 25 that when the screws are rotated to release the clamping plates 22, the collars will act against the undersides of the clamping plates and assist in removing the clamping plates from engagement with the filter bags, thus making it unnecessary to manually pull the clamping plates out of engagement with the filter bags.

The liquid to be filtered enters the conduit 16 and passes out through the conduits 17 into the filter bags 18 which filter the foreign matter out of the liquid and permit the filtered liquid to pass into the casing 1. In order to provide a compact arrangement for my filtering unit I prefer to roll the filter bags about the spool shaped member, but in doing this, it is necessary to provide a spacing means designated generally as 43 for spacing the adjacent surfaces of adjacent filter bags from each other so that the maximum amount of the filter surface of the filter bags may be utilized. Obviously if the adjacent surfaces of adjacent filter bags were brought into engagement with each other, the equal and opposite pressures within each of the filter bags would tend to neutralize each other and prevent the escape of liquid from the filter bags. The spacing members which I use are preferably reticulated members of the form best illustrated in Fig. 7. These reticulated members comprise a plurality of interconnected substantially coiled wire members 44 which have their coiled portions interlocked with each other. This form of reticulated member is very flexible in one direction and is easily rolled in that direction.

As I roll the filter bags 18 about the spool shaped member, I interpose the reticulated member between adjacent filter bags so that when the filter bags have been rolled about the spool shaped member, the reticulated members hold the surfaces of the filter bags out of engagement with each other in the manner best illustrated in Fig. 5. It will be understood, of course, that the filter bags are rolled as compactly as possible and that the filter bags and spacing members are so designed as to permit the maximum amount of filter surface to be used within a given amount of space.

In designing a particular filtering unit I prefer to make the casing 1 only large enough to receive the filtering unit after the filter bags and reticulated spacing members have been rolled about the spool shaped member. However, if I do this I find that the edges of the filter bags and the ends of the reticulated members have a tendency to interfere with the ready insertion of the filtering unit within the casing. Furthermore, the filter bags and reticulated spacing members have a tendency to take the position other than that given thereto as these members are rolled upon each other and tend to increase the overall diameter of the rolled filtering unit. In order to avoid this difficulty, I prefer to provide a frame or cage comprising two sections 27 of reticulated material hinged together about the pivot pin 28. Each of the members 27 are semi-spherical and are braced by means of the metal strips 29 which embrace the opposite ends thereof, and the metal strips 30 and 31 which embrace the edges adjacent the pivotal connection therebetween and the adjacent edges opposite the pivoted edges, respectively. The metal strips 30 have suitable bearing members formed therein which are staggered with relation to each other and form together with the pivot pin 28 a piano hinge for holding together the members 27. The metal strips 31 have their edges turned inwardly in the manner best illustrated in Fig. 5 to provide substantial broad contacting surfaces which prevent the edges of the reticulated member from overlapping and insure that whenever the strips 31 are brought into engagement with each other, the overall diameter of the cage will always be the same.

With this arrangement it will be seen that the cage holds the filter bags and reticulated members in proper position and it is only necessary to grasp the cage and hold the edges thereof together in order to always maintain the filter bags in proper relation with each other. If desired, I may provide the strips 31 with suitable means for locking the same together, but I have found as a matter of practical experience that it is unnecessary to do so.

The filtering unit is now ready to be inserted within the casing and all that is necessary is to throw back the cover after loosening the nut 12 and insert the cage with the filtering unit therein into the casing 1. The bottom of the casing 1 has an opening 32 therein and a conduit 33 screw threaded into the bottom of the casing communicates with the opening 32. A beveled seat 34 surrounds the opening 32 within the casing and the spool shaped member is provided with a corresponding beveled seat 35 at the lower end thereof and surrounding the opening 16 which extends through the spool shaped member. When the cage is inserted in the casing, the spool shaped member is centrally arranged and the seats 35 and 34 on the spool shaped member and casing respectively, are brought into engagement with each other and the openings 16 and 32 are brought into alinement with each other.

In order to hold the seats 35 and 34 in firm liquid tight engagement, I provide the following mechanism: A hollow boss 36 is provided on the interior of the cover 4 and this boss receives a spring 37 which is held in place within said boss by means of an offset portion 38 on the spring arranged within a suitable recess in the cover as best illustrated in Fig. 1. The spring 37 therefore is carried by the cover. The upper part of the spool shaped member has a plug 39 screw threaded therein so as to close the upper end of the opening 16 which extends through the spool shaped member. The plug 39 is provided with the openings 40 which are for the purpose of receiving a suitable tool for removing the plug from the position shown in Fig. 1. The end of the spring 37 which extends out of the boss 36 is adapted to engage the plug 39 when the cover 4 is brought into position over the open end of the casing and as the nut 13 is rotated to draw the arm 2 and cover 4 downwardly, the spring 37 is compressed and the compression of the spring reacts to urge the filtering unit downwardly so that the seats 35 and 34 are held in firm engagement with each other.

The bottom of the casing is also provided with an outlet conduit 41, which is screw threaded therein and which communicates with the interior of the casing by means of the opening 42 in the bottom of the casing.

The liquid to be filtered enters the opening 16 by way of the conduit 33 and passes outwardly through the opening 17 into the filter bags. The filter bags prevent the passage of the solid particles within the liquid and only the clean liquid is permitted to pass therethrough. The liquid which passes out through the filter bags passes downwardly into the bottom of the casing through the reticulated members 43. The filtered liquid passes out of the casing through the conduit 41. In order to prevent the filter bags from dropping by gravity to the bottom of the casing and thereby clogging the outlet opening 42, I provide a plate 45 which rests on a seat 46 surrounding the opening 32 and this plate 45 will prevent the filter bags from dropping downwardly into engagement with the bottom of the casing. Free passage of the liquid therefore is provided from the time the same enters the inlet conduit 33 to the time it leaves the outlet conduit 41 except for the restraint exerted thereon by the filter bags as the liquid passes therethrough.

Filtering units of this type are generally used for lubricating machinery which depends partly if not entirely upon the amount of oil forced thereto through the filtering unit and associated mechanism. Therefore, if no oil can pass through the filtering unit, no oil can be supplied to the machines and as a result, serious damage may ensue. In order to prevent this from happening, I provide a by-pass in my filtering unit which acts automatically to by-pass the liquid when the filter bags become clogged to a predetermined degree. In this manner although the oil that is by-passed is contaminated as it is recirculated back to the machine it is better to have contaminated oil supplied to the machine than no oil at all. Therefore it is always insured that some oil, whether pure or contaminated, is always supplied to the machine being lubricated. The by-pass construction is as follows:

The opening 16 which extends through the spool shaped member has a restricted portion 47 forming a seat for the ball valve 48 and a spring 49, arranged between the plug 39 and the ball valve 48, holds the ball valve against its seat. There is an opening 50 in the upper end of the spool shaped member which communicates with the longitudinal opening 16 above the ball valve 48 and also communicates with the interior of the casing outside of the filtering unit. By this arrangement when the pressure is increased within the filtering unit to such an extent that the spring 49 is compressed, the liquid is permitted to flow past the ball valve and out through the opening 50 into the casing 1. The liquid thereafter flows downwardly through the reticulated spacing members and out through the outlet conduit 41 without passing through the filter bags.

In order to permit ready removal of the filtering unit from the casing and also for centering the upper end of the filtering unit within the casing, I provide a plate 51 which is substantially square but has the corners thereof cut to conform to the inner periphery of the casing as best illustrated in Fig. 3. This plate is provided with the openings 52 for the fingers and the opening 53 for the thumb of the person removing the filtering unit. One merely has to insert the fingers and the thumb in these openings and by pulling upwardly on the plate 51, the entire unit can be removed from the casing. The plate 51 has a slot 54 which has substantially the same cross-section as the cross member 55 which is made integral with the spool shaped member. When assembling the device, the plate 51 is lowered over the cross member 55 with the slot parallel to the cross member 55. In view of the fact that the slot is substantially the same shape as the cross member 55, the plate is permitted to pass over the cross member and then this plate is rotated through approximately 90 degrees and secured to the cross member by means of the bolts 56.

A pressure relief valve 57 is arranged in the cover and this relief valve may be used either to release any entrapped air or drain out the liquid therein or may be used for the purpose of sampling the oil which is being filtered.

In Fig. 5 it will be noticed that as the filter bags are rolled about the spool shaped members, a portion of each filter bag overlies its respective opening 17. If the mouth of the opening were in a single plane, the filter bag would have a tendency to close the opening and the only part of the filter bag which could be utilized would be that part adjacent the mouth of the opening. In order to prevent this I provide a plurality of notches 58 in the lips surrounding the openings and these permit the oil or the liquid to pass into the other portions of the filter bag and therefore aid in the proper distribution of the liquid being filtered.

Obviously those skilled in the art to which this invention pertains may make various changes in the construction and arrangement of parts shown in the accompanying drawings without departing from the spirit of this invention or the scope of the appended claims.

Having thus fully described an embodiment of my invention, what I desire to secure by Letters Patent of the United States is:

1. A filter comprising a spool shaped member having radial extensions thereon, openings through said extensions, filter bags communicating with said openings, and clamping plates for holding the edges of said filter bags in place over said extensions, each of said clamping plates being mounted on said member to engage opposed edges of adjacent filter bags.

2. In a filter the combination with an open ended casing, of a cover for said casing and a filtering unit arranged within said casing, said filtering unit comprising a central conduit having radiating passages extending outwardly therefrom, lips surrounding said passages, filter bags arranged over said lips and secured in place thereon by suitable clamping means, said filter bags being rolled about said central conduit, spacing members between adjacent filter bags, a spring on said cover, an outlet for said casing, an inlet for said casing, said spring being adapted to engage said conduit and hold the same in liquid tight communication with said inlet when said cover is closed, and a spacing member arranged about said conduit at a substantial distance from said inlet and secured to said conduit for holding said conduit in predetermined spaced relation to the inner walls of said casing.

3. A filter comprising a conduit having a plurality of outwardly extending projections thereon, said projections having openings therethrough communicating with the interior of said conduit, said openings forming lips about the edges of said projections, open-mouthed filter bags having their mouths arranged over said projections so that the openings in said projections communicate with the interiors of said filter bags, plates arranged between adjacent projections and means for holding said plates against adjacent edges of adjacent filter bags.

4. A filter comprising a member having a passage therethrough, a plurality of spaced projections having openings therethrough communicating with said passage, open-mouthed filter bags having their mouths arranged over said projections so that said openings communicate with the interiors of said filter bags, clamping plates arranged between adjacent filter bags and means for releasably holding said plates in engagement with the adjacent edges of adjacent filter bags and said last mentioned edges against said projections.

5. A filter comprising a member having a passage therethrough, a plurality of spaced projections having openings therethrough communicating with said passage, open-mouthed filter bags having their mouths arranged over said projections so that said openings communicate with the interiors of said filter bags, clamping plates arranged between adjacent filter bags and means for releasably holding said plates in engagement with the adjacent edges of adjacent filter bags and said last mentioned edges against said projections, said means for holding said plates against the adjacent edges of adjacent bags comprising screws rotatably mounted in said plates but held against accidental separation therefrom, said member having threaded openings therein for the reception of said screws.

6. In a filter, the combination with a member having a passage extending therethrough, projections on said member extending outwardly therefrom and having openings therein communicating with said passage, open-mouthed filter bags having their mouths arranged over said projections, plates arranged between adjacent projections and means for holding said plates against adjacent edges of adjacent filter bags to clamp the same in position against their respective projections, flexible reticulated elements arranged between said filter bags, said bags and reticulated members being rolled about said first mentioned member and a casing adapted to receive said filter bags in compacted position about said first mentioned member.

7. A filter unit comprising a member having a passage therethrough, a projection extending outwardly from said member and having an opening therein communicating with said passage, a filter bag having an open mouth arranged over said projection with said opening in communication with the opening of said filter bag, the edge of said projection surrounding said opening being irregular so that when said filter bag is wrapped about said member the communication between said opening and the interior of said filter bag is not cut off.

8. A filter unit comprising a member having a passage therethrough, openings in said member communicating with said passage and wrapped spirally about said member, said filter bags when in wrapped position being adapted to substantially fill said casing and a cage for confining said bags in a space less than the space within said casing and prior to the insertion of said bags into said casing, said cage being insertable into said casing with said bags and while said bags are arranged therein, said cage and filter bags substantially filling said casing when arranged therein and said cage being held in operative position about said bags by said casing.

9. In a filter, the combination with a casing, of a plurality of filter elements, a conduit having a plurality of openings therein communicating with said filter elements, said filter elements being wound about said conduit, and means for releasably confining said filter elements in position about said conduit to assist the insertion of said filter elements into said casing comprising a multi-parted substantially cylindrical cage having portions thereof movable laterally away from said conduit to release said filter element when said cage is outside of said casing, said cage also holding said filter elements in compacted position while said filter elements are in said casing and being removed therefrom, the inner wall of said casing engaging the sides of said cage when said cage is within said casing and in compacted relation about said filter elements to prevent outward movement of the portions of said cage, whereby the portions of said cage are held in operative position about said filter elements.

10. A filter comprising a conduit having a plurality of openings therein arranged peripherally thereabout, a plurality of filter bags, each of said filter bags being arranged in communication with an opening in said conduit, each of said filter bags communicating with a different opening than the others, and releasable clamping plates arranged between adjacent openings for engaging the edges of both filter bags which communicate with the adjacent filter openings on each side of said plates to hold said edges in operative position with respect to their openings.

11. A filter comprising a spool shaped member having radial extensions thereon, openings through said extensions, filter bags communicating with said openings and having a peripheral edge formed with a bead, and clamping plates for holding the edges of said filter bags in place over said extensions, each of said clamping plates being mounted on said member to engage opposed edges of adjacent filter bags and being arranged to clamp the beads on said bags between said plate and said spool shaped member.

12. In a filter, the combination with an open ended casing, of a cover for said casing, and a filter unit arranged within said casing, said filter unit comprising a central conduit having radiating passages extending outwardly therefrom, lips surrounding said passages having transverse openings therein, open mouthed filter bags having their mouths arranged over said lips and secured in place thereover by suitable clamping means, said filter bags being rolled about said conduit and being secured about their respective lips at points between said transverse openings in said lips and said conduit whereby when said filter elements are rolled about said central conduit, the liquid to be filtered can communicate with the interior of said bags through said transverse openings so that liquid will flow into said bags even if portions of said bags lie firmly against said lips, an inlet for said casing, an outlet for said casing, and means for holding said central conduit in liquid-tight communication with said inlet when said cover is closed, and means extending outwardly from said conduit for spacing said conduit in predetermined spaced relation to the inner walls of said casing.

13. A filter unit for filtering liquids comprising a central liquid supplying conduit having a longitudinal passage therewith and a transversely extending lip portion forming an opening for the passage of the liquid to be filtered, transverse openings in said lips between said conduit and the outer edges of said lips, and a filter bag having an open mouth secured over said lips and in place thereon, said filter bag being adapted to be wrapped about said conduit, and said transverse openings being arranged to permit flow of the liquid to be filtered into said filter bag even though the filter bag when in wrapped relation about said conduit is against said lips.

14. In a filter unit adapted to be inserted within a casing, the combination with a central conduit having lateral passages and filter elements communicating therewith, of a flange spaced longitudinally of said conduit from said filter elements and extending outwardly from said conduit, said flange having an irregularly shaped periphery and a spacing plate adapted to be secured to the side of said flange between said flange and said filter elements having an opening therein of a size and shape sufficient to permit said plate to be moved over said flange with portions adjacent said opening sufficiently close with respect to each other to permit the same to support said flange when said plate is turned about an axis of said conduit after having been slipped over said flange, whereby said plate can be lifted and simultaneously carry the conduit therewith, said flange being supported on the upper side of said plate and being secured thereto when in operative position, said plate also forming a spacing means for spacing said conduit centrally of the casing into which the same is adapted to be inserted.

15. In a filler unit adapted to be inserted within a casing, the combination with a central conduit having lateral passages and filter elements communicating therewith, of a flange spaced longitudinally of said conduit from said filter elements and extending outwardly from said conduit, said flange having an irregularly shaped periphery and a spacing plate adapted to be secured to the side of said flange between said flange and said filter elements having an opening therein of a size and shape sufficient to permit said plate to be moved over said flange with portions adjacent said opening sufficiently close with respect to each other to permit the same to support said flange when said plate is turned about an axis of said conduit after having been slipped over said flange, whereby said plate can be lifted and simultaneously carry the conduit therewith, said flange being supported on the upper side of said plate and being secured thereto when in operative position, said plate also forming a spacing means for spacing said conduit centrally of the casing into which the same is adapted to be inserted, and having additional openings therein, one for the thumb of an operator and the others for the fingers of the operator arranged in substantially the same spaced relation about said plate as the fingers and thumb of an operator would normally bear with respect to each other when in a natural position for grasping the filter unit to remove the same.

16. A filtering mechanism including a casing for retaining fluid under pressure, a central column within said casing having a longitudinal passageway therein for receiving fluid under pressure, said column being provided with ports for directing fluid from said passageway, a filter bag companion to each port and having the mouth thereof positioned over said port, clamping means for securing the margins of said filter bags against the external surface of said column, and spaced means positioned above and below each port and extending radially to provide spacers and thereby prevent the collapsing of the filter bags over their companion ports.

17. A filtering mechanism including a casing for retaining fluid under pressure, a central column within said casing having a longitudinal passageway therein for receiving fluid under pressure, said column being provided with ports for directing fluid from said passageway, a filter bag companion to each port and having the mouth thereof positioned over said port, clamping means for securing the margins of said filter bags against the external surface of said column, and spacing means projecting radially from said column at spaced intervals about said mouth and projecting into said mouth of each filter bag a distance which is greater than the thickness of the clamping means, whereby to position the section of the filter bag wall adjacent each port a sufficient distance therefrom to permit the discharge of fluid into the bag.

WILLIAM W. NUGENT.